No. 759,124. PATENTED MAY 3, 1904.
W. C. OSWALD.
VEHICLE WHEEL.
APPLICATION FILED DEC. 1, 1902.
NO MODEL.
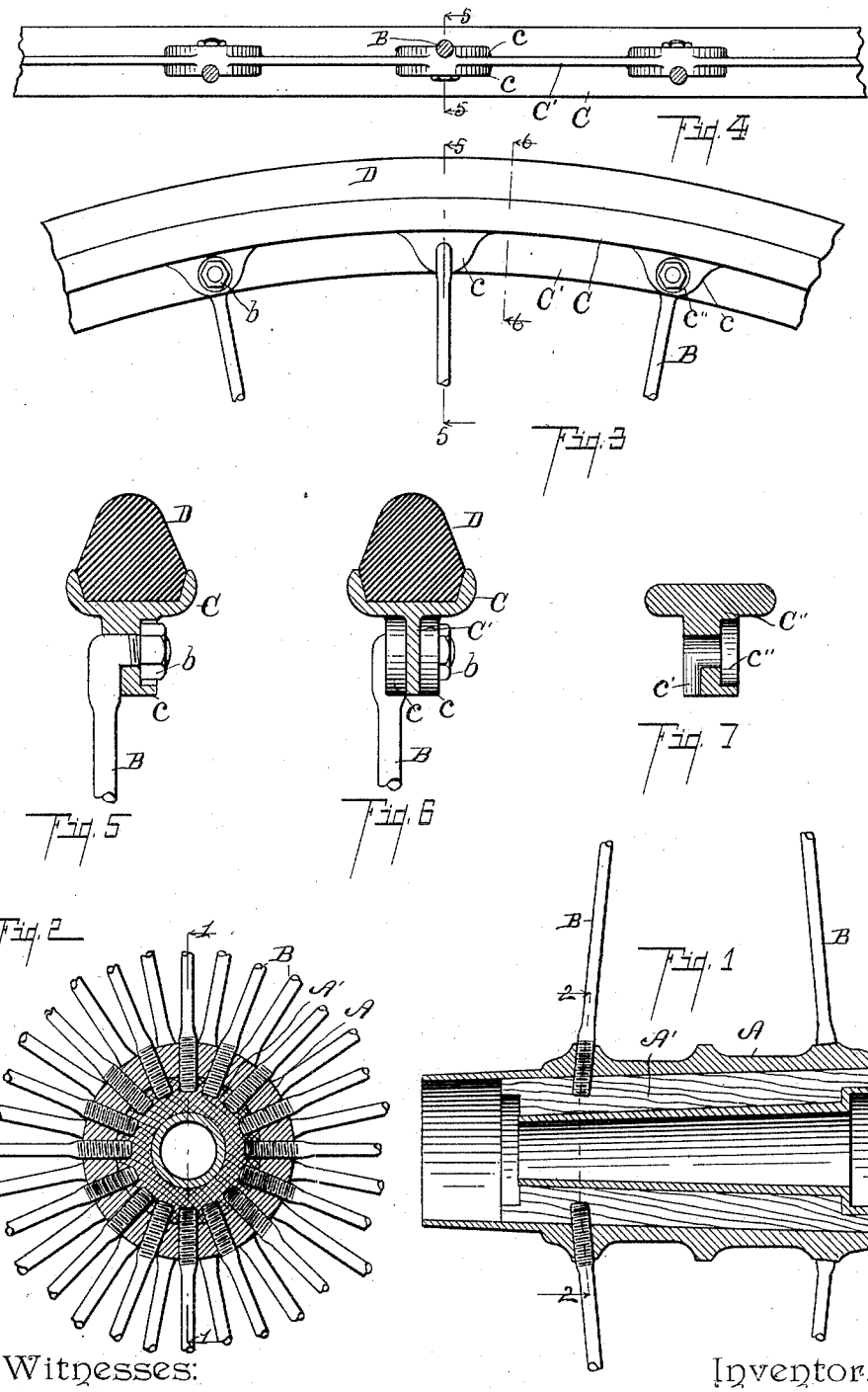

No. 759,124.

Patented May 3, 1904.

UNITED STATES PATENT OFFICE.

WILLIAM C. OSWALD, OF KALAMAZOO, MICHIGAN.

VEHICLE-WHEEL.

SPECIFICATION forming part of Letters Patent No. 759,124, dated May 3, 1904.

Application filed December 1, 1902. Serial No. 133,446. (No model.)

*To all whom it may concern:*

Be it known that I, WILLIAM C. OSWALD, a citizen of the United States, residing at the city of Kalamazoo, in the county of Kalamazoo and State of Michigan, have invented certain new and useful Improvements in Vehicle-Wheels, of which the following is a specification.

This invention relates to improvements in metal wheels. It is designed particularly for use on vehicles, such as carriages and light wagons, although it is adapted for use in other relations.

The objects of my invention are, first, to provide an improved metal wheel in which the vibration of the parts is reduced to a minimum; second, to provide an improved construction of metal wheel which is light in weight, simple and economical in its construction, and strong and durable in use; third, to provide an improved means of adjusting the tension of the spokes of a metal wheel; fourth, to provide in a metal wheel an improved means by which it may be easily and quickly repaired without disturbing the uninjured parts of the wheel.

Further objects will definitely appear from the detailed description to follow.

I accomplish the objects of my invention by the devices and means described in the following specification.

The invention is clearly defined, and pointed out in the claims.

A structure embodying the features of my invention is fully illustrated in the accompanying drawings, forming a part of this specification, in which—

Figure 1 is a detail longitudinal sectional view through the hub of my improved wheel, taken on a line corresponding to line 1 1 of Fig. 2. Fig. 2 is a detail transverse sectional view through the hub of my improved wheel, taken on a line corresponding to the irregular line 2 2 of Fig. 1. Fig. 3 is an enlarged detail side elevation view of the rim of my improved vehicle-wheel, showing the structure of the same and the manner of securing the spokes thereto. Fig. 4 is a detail view of the rim of my improved wheel, taken from the inside, the spokes being in section. Fig. 5 is an enlarged detail cross-sectional view of the rim, taken on lines 5 5 of Figs. 3 and 4, one of the spokes B and its securing means being shown in full lines. Fig. 6 is an enlarged detail cross-sectional view taken on a line corresponding to line 6 6 of Fig. 3. Fig. 7 is a detail cross-sectional view corresponding to the view shown in Fig. 5 of a modification, the rim or felly being adapted for use as a tread.

In the drawings the sectional views are taken looking in the direction of the little arrows at the ends of the section-lines, and similar letters of reference refer to similar parts throughout the several views.

Referring to the lettered parts of the drawings, I provide a metal hub A, which is provided with suitable threaded sockets to receive the threaded ends of the spokes B. Within the metal hub A is a wood center A', adapted to form a seat for the boxing, which is of the usual or any desired construction. The spokes B are preferably secured to the hub A in the staggered relation. The channel-rim C is in the form of a T-iron, having an inwardly-projecting leg C', to which the spokes are secured. Upon this leg C' at suitable intervals I form enlargements $c$. These enlargements are perforated and are provided with seats $c'$ to receive the ends of the spokes B, which are bent at right angles and threaded to receive a nut $b$, a seat $c''$ being formed in the opposite side of the enlargements for the nut. By this arrangement of the parts the spokes can be screwed into their sockets in the hub until they are properly adjusted and the end inserted through the perforations in the flange on the rim and clamped into position in the seats provided therefor by the nuts $b$. As the heads of the spokes are firmly clamped into the seats in the leg C' of the rim, the vibration of the spokes is reduced to a minimum. The rim is also so strengthened by the flange C' that its vibration and liability to injury in striking against solid obstacles is also reduced to a minimum.

I preferably form the rim of my improved wheel into a channel form to receive the rubber tire or tread D, as illustrated in Figs. 3 to 6, inclusive. The rim is, however, entirely satisfactory and sufficiently strong, owing to its shape, to be practical for use as a flat tire or tread C'', as illustrated in the modified structure shown in Fig. 7.

My improved wheel, owing to the arrangement of the parts, can be made of very light material and still be rigid and durable. It is capable of sustaining great strain in proportion to the weight of the materials entering into the same. It is simple and economical to manufacture and may be quickly and easily repaired by an inexperienced workman. The structure is also attractive in appearance.

The enlargements $c$ on the flange or leg C' serve to brace the same against lateral strain, so that it can be made comparatively light. However, if desired, the same can be made of a sufficient thickness to contain the seats for the ends of the spokes.

I have illustrated and described my improved metal wheel in the form preferred by me. I am aware, however, that it is capable of considerable variation without departing from my invention.

Having thus described my invention, what I claim as new, and desire to secure by Letters Patent, is—

1. In a wheel, the combination of a hub having screw-threaded spoke-sockets therein; a T-shaped channeled rim C, having enlargements $c$ formed at intervals on the inwardly-extending leg C' thereof; suitable seats $c'$ $c''$ in said enlargements; spokes B screw-threaded at their ends, the outer ends of said spokes being bent substantially at right angles and adapted to be inserted through suitable perforations in said enlargements; nuts $b$ for clamping said spokes into said seats and a rubber tread D for said rim, coacting for the purpose specified.

2. In a wheel, the combination of a hub having screw-threaded spoke-sockets therein; a T-shaped rim having enlargements $c$ formed at intervals on the inwardly-extending leg C' thereof; suitable seats $c'$ $c''$ in said enlargements; spokes B screw-threaded at their ends, the outer ends of said spokes being bent substantially at right angles and adapted to be inserted through suitable perforations in said enlargements; nuts for clamping said spokes into said seats, coacting for the purpose specified.

3. In a wheel, the combination with a rim having an inwardly-extending leg or flange, of a spoke having its end angularly bent and extended through a perforation provided in the leg or flange, and a nut tapped on to the outer end of the spoke, said leg or flange being provided with a radial seat coincident with and adapted to receive the outer portion of the body of the spoke and a second seat adapted to receive the spoke-securing nut.

In witness whereof I have hereunto set my hand and seal in the presence of two witnesses.

WILLIAM C. OSWALD. [L. S.]

Witnesses:
 ETHEL A. TELLER,
 OTIS A. EARL.